(12) United States Patent
Kim et al.

(10) Patent No.: US 10,135,514 B2
(45) Date of Patent: *Nov. 20, 2018

(54) METHOD AND APPARATUS FOR PROVIDING CHANNEL STATE INFORMATION-REFERENCE SIGNAL (CSI-RS) CONFIGURATION INFORMATION IN A WIRELESS COMMUNICATION SYSTEM SUPPORTING MULTIPLE ANTENNAS

(71) Applicant: LG ELECTRONICS INC., Seoul (KR)

(72) Inventors: Kijun Kim, Anyang-si (KR); Hyungtae Kim, Anyang-si (KR); Hanbyul Seo, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,711

(22) Filed: Nov. 4, 2016

(65) Prior Publication Data

US 2017/0078011 A1 Mar. 16, 2017

Related U.S. Application Data

(63) Continuation of application No. 14/961,612, filed on Dec. 7, 2015, now Pat. No. 9,509,390, which is a (Continued)

(51) Int. Cl.
*H04B 7/24* (2006.01)
*H04B 7/06* (2006.01)
(Continued)

(52) U.S. Cl.
CPC .......... *H04B 7/0626* (2013.01); *H04B 7/024* (2013.01); *H04J 11/0036* (2013.01);
(Continued)

(58) Field of Classification Search
CPC ... H04B 7/0626; H04B 7/024; H04W 72/085; H04W 76/046; H04W 72/082;
(Continued)

(56) References Cited

U.S. PATENT DOCUMENTS 7,813,291 B2 * 10/2010 Yoon ............... H04L 1/0028
370/252
2009/0054093 A1 * 2/2009 Kim ................ H04B 7/061
455/500
(Continued)

FOREIGN PATENT DOCUMENTS

CN 101635950 A 1/2010
EP 2 157 751 A1 2/2010
(Continued)

OTHER PUBLICATIONS

ZTE, "Inter-cell CSI-RS design," 3GPP TSG RAN WG1 Meeting #59 bis, Valencia, Spain, Jan. 18-22, 2010, R1-100537, pp. 1-4.
(Continued)

*Primary Examiner* — Hashim S Bhatti
(74) *Attorney, Agent, or Firm* — Birch, Stewart, Kolasch & Birch, LLP

(57) ABSTRACT

A method and a mobile station for transmitting channel state information (CSI) to a base station; and a method and a base station for receiving CSI from a mobile station in a wireless communication system are discussed. The method according to an embodiment includes receiving first information on one or more channel quality measurement resources and second information on one or more interference measurement resources from a base station; receiving reference
(Continued)

signals based on the first information from the base station; generating the CSI by using the reference signals and the second information; and transmitting the CSI to the base station.

16 Claims, 14 Drawing Sheets

Related U.S. Application Data continuation of application No. 14/622,332, filed on Feb. 13, 2015, now Pat. No. 9,236,990, which is a continuation of application No. 13/510,222, filed as application No. PCT/KR2011/001833 on Mar. 16, 2011, now Pat. No. 8,989,114.

(60) Provisional application No. 61/413,924, filed on Nov. 15, 2010, provisional application No. 61/314,981, filed on Mar. 17, 2010.

(51) Int. Cl.

| | | |
|---|---|---|
| *H04W 76/27* | (2018.01) | |
| *H04B 7/024* | (2017.01) | |
| *H04J 11/00* | (2006.01) | |
| *H04L 5/00* | (2006.01) | |
| *H04W 24/08* | (2009.01) | |
| *H04W 72/04* | (2009.01) | |
| *H04W 72/08* | (2009.01) | |
| *H04L 25/03* | (2006.01) | |
| *H04W 88/02* | (2009.01) | |
| *H04W 88/08* | (2009.01) | |

(52) U.S. Cl.
CPC .......... *H04L 5/0023* (2013.01); *H04L 5/0048* (2013.01); *H04L 5/0053* (2013.01); *H04L 5/0057* (2013.01); *H04L 5/0094* (2013.01); *H04W 24/08* (2013.01); *H04W 72/042* (2013.01); *H04W 72/0406* (2013.01); *H04W 72/0413* (2013.01); *H04W 72/082* (2013.01); *H04W 72/085* (2013.01); *H04W 76/27* (2018.02); *H04L 25/03343* (2013.01); *H04L 2025/03426* (2013.01); *H04W 88/02* (2013.01); *H04W 88/08* (2013.01)

(58) Field of Classification Search
CPC ......... H04W 72/0406; H04W 72/0413; H04W 72/042; H04W 24/08; H04W 88/08; H04W 88/02; H04L 5/0057; H04L 5/004; H04L 5/0053; H04L 5/0023; H04L 5/0094; H04L 25/03343; H04L 2025/03426; H04J 11/0036
See application file for complete search history.

(56) References Cited

U.S. PATENT DOCUMENTS

| | | | |
|---|---|---|---|
| 2009/0257388 A1 | 10/2009 | Khandekar et al. | |
| 2010/0254320 A1 | 10/2010 | Aoyama | |
| 2011/0021230 A1* | 1/2011 | Moberg ................ | H04L 1/0027 455/507 |
| 2011/0170435 A1* | 7/2011 | Kim ..................... | H04L 5/0023 370/252 |
| 2011/0170496 A1* | 7/2011 | Fong .................... | H04L 5/0053 370/329 |
| 2011/0199986 A1* | 8/2011 | Fong .................... | H04L 5/0035 370/329 |
| 2012/0076106 A1* | 3/2012 | Bhattad ................ | H04L 5/0035 370/330 |
| 2012/0315859 A1* | 12/2012 | Lee, II .................. | H04J 11/005 455/67.13 |
| 2013/0039203 A1* | 2/2013 | Fong .................... | H04B 7/024 370/252 |
| 2013/0077518 A1* | 3/2013 | Abe ..................... | H04W 48/08 370/252 |
| 2013/0094384 A1 | 4/2013 | Park et al. | |
| 2013/0315197 A1* | 11/2013 | Park .................... | H04W 72/042 370/329 |

FOREIGN PATENT DOCUMENTS

| | | |
|---|---|---|
| EP | 2985931 A1 | 2/2016 |
| JP | 2013-520935 A | 6/2013 |
| WO | WO 2008/023791 A1 | 2/2008 |
| WO | WO 2011/044530 A2 | 4/2011 |
| WO | WO 2011/106457 A2 | 9/2011 |

OTHER PUBLICATIONS

Alcatel-Lucent et al., "On CSI RS Design", 3GPP TSG-RAN WG1 #59bis, R1-100416, Valencia, Spain, Jan. 18-22, 2010, 3 pages.
Ericsson et al., "On CSI RS Design", 3GPP TSG-RAN WG1 #59bis, R1-100048, Valencia, Spain, Jan. 18-22, 2010, 3 pages.
LG Electronics, "Inter-Cell CSI-RS design and Inter-Cell measurement consideration", TSG-RAN WG1 Meeting #60, R1-101550, San Francisco, USA, Feb. 22-26, 2010, 4 pages.
Nokia et al., "Further details on intra-cell CSI-RS design", 3GPP TSG-RAN WG1 Meeting #60, R1-101426, San Francisco, USA, Feb. 22-26, 2010, 6 pages.
Nokia et al., "Intra-cell CSI-RS design aspects", 3GPP TSG-RAN WG1 Meeting #59, R1-094647, Jeju, Korea, Nov. 9-13, 2009, 8 pages.
NTT DOCOMO, "CSI-RS Design for LTE-Advanced", 3GPP TSG RAN WG1 Meeting #60, R1-101214, San Francisco, USA, Feb. 22-26, 2010, 5 pages.
CATT, "Consistent design of CSI-RS for FDD and TDD," 3GPP TSG RAN WG1 Meeting #58 bis, R1-094137, Miyazaki, Japan, Oct. 12-16, 2009, 3 pages.
Samsung, "Discussions on CSI-RS for LTE-Advanced," 3GPP TSG RAN WG1 #58, R1-093375, Shenzhen, China, Aug. 24-28, 2009, 6pgs.
LG Electronics, "Inter-Cell CSI-RS design and Inter-Cell Measurement Consideration", TSG-RAN WG1 Meeting #60, R1-101550, San Francisco, USA, Feb. 22-26, 2010, 3 pages.

* cited by examiner (a)

(b)

METHOD AND APPARATUS FOR PROVIDING CHANNEL STATE INFORMATION-REFERENCE SIGNAL (CSI-RS) CONFIGURATION INFORMATION IN A WIRELESS COMMUNICATION SYSTEM SUPPORTING MULTIPLE ANTENNAS

CROSS-REFERENCE TO RELATED APPLICATIONS

This application is a Continuation of U.S. patent application Ser. No. 14/961,612 filed on Dec. 7, 2015, which is a Continuation of U.S. patent application Ser. No. 14/622,332 filed on Feb. 13, 2015 (now U.S. Pat. No. 9,236,990 issued on Jan. 12, 2016), which is a Continuation of U.S. patent application Ser. No. 13/510,222 filed on May 16, 2012 (now U.S. Pat. No. 8,989,114 issued on Mar. 24, 2015), which is filed as the National Phase of PCT/KR2011/001833 filed on Mar. 16, 2011, which claims the benefit under 35 U.S.C. § 119(e) to U.S. Provisional Application No. 61/413,924 filed on Nov. 15, 2010 and 61/314,981 filed on Mar. 17, 2010, all of which are hereby expressly incorporated by reference into the present application.

BACKGROUND OF THE INVENTION

Field of the Invention

The present invention relates to a wireless communication system, and more particularly, to a method and an apparatus for providing Channel State Information-Reference Signal (CSI-RS) configuration information in a wireless communication system supporting multiple antennas.

Discussion of the Related Art

A Multiple Input Multiple Output (MIMO) system refers to a system for improving data transmission/reception efficiency using multiple Transmission (Tx) antennas and multiple Reception (Rx) antennas. In a MIMO system, each transmission antenna has an independent data channel. The Tx may be a virtual antenna or a physical antenna. A receiver estimates a channel with respect to each Tx antenna and receives data transmitted from each Tx antenna based on the channel estimation.

Channel estimation refers to a process of compensating for signal distortion caused by fading so as to restore the received signal. Fading refers to a phenomenon in which the intensity of a signal is rapidly changed due to multi-path time delay in a wireless communication system environment. For channel estimation, a reference signal known to both a transmitter and a receiver is necessary. The reference signal may be abbreviated to RS or referred to as a pilot signal according to the standard.

A downlink RS is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink RS includes a Common Reference Signal (CRS) shared among all UEs in a cell and a Dedicated Reference Signal (DRS) for a specific UE.

In a system having an antenna configuration (e.g., a system according to the Long Term Evolution-Advanced (LTE-A) standard supporting eight Tx antennas) developed as an extension of a legacy communication system (e.g., a system based on LTE Release 8 or 9) supporting four Tx antennas, DRS-based data demodulation has been considered in order to support efficient RS management and develop an advanced transmission scheme. That is, in order to support data transmission through extended antennas, DRSs for two or more layers may be defined. Since the DRSs are precoded using the same precoder as used for data, it is possible for a receiver to easily estimate channel information for demodulating data without separate precoding information.

A downlink receiver may acquire precoded channel information with respect to the extended antenna configuration through DRSs. However, in order to acquire non-precoded channel information, separate RSs are required in addition to the DRSs. In a system based on the LTE-A standard, RSs for acquiring Channel State Information (CSI) at a receiver, that is, CSI-RSs, may be defined.

SUMMARY OF THE INVENTION

An object of the present invention devised to solve the problem lies on efficient and accurate measurement and reporting of Channel State Information (CSI) using one or more Channel State Information-Reference Signal (CSI-RS) configurations.

The object of the present invention can be achieved by providing a method for transmitting Channel State Information-Reference Signals (CSI-RSs) from a base station supporting multiple transmit antennas to a mobile station, including transmitting, at the base station, information of one or more CSI-RS configurations to the mobile station, wherein the one or more CSI-RS configurations include one CSI-RS configuration for which the mobile station assumes non-zero transmission power for CSI-RS, transmitting, at the base station, information indicating CSI-RS configuration for which the mobile station assumes zero transmission power for CSI-RS among the one or more CSI-RS configurations to the mobile station, mapping, at the base station, CSI-RSs to resource elements of a downlink subframe based on the one or more CSI-RS configurations, and transmitting, at the base station, the downlink subframe mapped with the CSI-RSs to the mobile station.

In another aspect of the present invention, provided herein is a method for transmitting CSI at a mobile station using a CSI-RS from a base station supporting multiple transmit antennas, including receiving, at the mobile station, information of one or more CSI-RS configurations from the base station, wherein the one or more CSI-RS configurations include one CSI-RS configuration for which the mobile station assumes non-zero transmission power for a CSI-RS, receiving, at the mobile station, information indicating a CSI-RS configuration for which the mobile station assumes zero transmission power for a CSI-RS among the one or more CSI-RS configurations from the base station, receiving, at the mobile station, a downlink subframe of which resource elements are mapped with CSI-RSs based on the one or more CSI-RS configurations from the base station, and transmitting, at the mobile station, the CSI measured by using the CSI-RSs to the base station.

In another aspect of the present invention, provided herein is a base station for transmitting a CSI-RS for multiple antennas transmission, including a receiving module for receiving an uplink signal from a mobile station, a transmitting module for transmitting a downlink signal to the mobile station, and a processor for controlling the base station comprising the receiving module and the transmitting module. The processor is configured to transmit, via the transmitting module, information of one or more CSI-RS configurations to the mobile station, the one or more CSI-RS configurations including one CSI-RS configuration for which the mobile station assumes non-zero transmission power for a CSI-RS, transmit, via the transmitting module, information indicating a CSI-RS configuration for which the mobile station assumes zero transmission power for a CSI-RS among the one or more CSI-RS configurations to the mobile station, map CSI-RSs to resource elements of a downlink subframe based on the one or more CSI-RS configurations, and transmit, via the transmitting module, the downlink subframe mapped with the CSI-RSs to the mobile station.

In a further aspect of the present invention, provided herein is a mobile station for transmitting CSI using a CSI-RS from a base station supporting multiple transmit antennas, including a receiving module for receiving a downlink signal from the base station, a transmitting module for transmitting an uplink signal to the base station, and a processor for controlling the mobile station comprising the receiving module and the transmitting module. The processor is configured to receive, via the receiving module, information of one or more CSI-RS configurations from the base station, wherein the one or more CSI-RS configurations include one CSI-RS configuration for which the mobile station assumes non-zero transmission power for a CSI-RS, receive, via the receiving module, information indicating a CSI-RS configuration for which the mobile station assumes zero transmission power for a CSI-RS among the one or more CSI-RS configurations from the base station, receive, via the receiving module, a downlink subframe of which resource elements are mapped with CSI-RSs based on the one or more CSI-RS configurations from the base station, and transmit, via the transmitting module, the CSI measured by using the CSI-RSs to the base station.

In each aspect of the present invention, the one or more CSI-RS configurations may indicate positions of the resource elements mapped with the CSI-RSs.

The downlink subframe mapped with the CSI-RSs may be configured by a predetermined period and a predetermined offset.

The predetermined period and the predetermined offset may be configured as cell-specific.

The predetermined period and the predetermined offset may be configured separately for CSI-RSs for which the mobile station assume non-zero and zero transmission power.

The CSI-RS configuration for which the mobile station assumes zero transmission power for the CSI-RS may correspond to positions of resource elements where CSI-RSs of neighbor base station are transmitted.

The CSI-RSs may be transmitted for one, two, four or eight antenna ports.

The BS may transmit to the mobile station an indication of a CSI-RS configuration used for CSI feedback by the mobile station among the one or more CSI-RS configurations, through dedicated RRC (Radio Resource Control) signaling.

The above-mentioned general description of the present invention and the following detailed description of the present invention are merely exemplary and provide an additional description of the appended claims of the present invention.

According to embodiments of the present invention, CSI can be efficiently and accurately measured and reported using one or more CSI-RS configurations.

Additional advantages of the present invention will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE EMBODIMENTS

Figure 1:
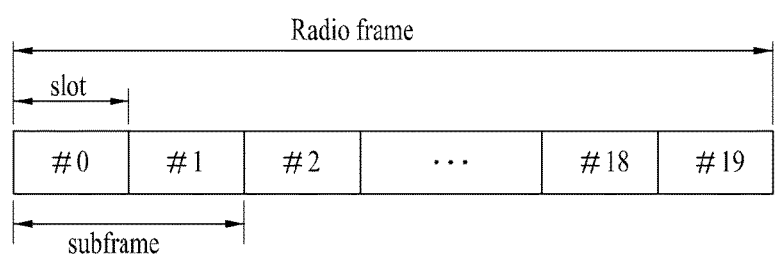
FIG. 1 is a diagram illustrating the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram illustrating the structure of the type 1 radio frame. A downlink radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in a radio frame, the number of slots included in a subframe or the number of symbols included in a slot may be changed in various manners.

Figure 2:
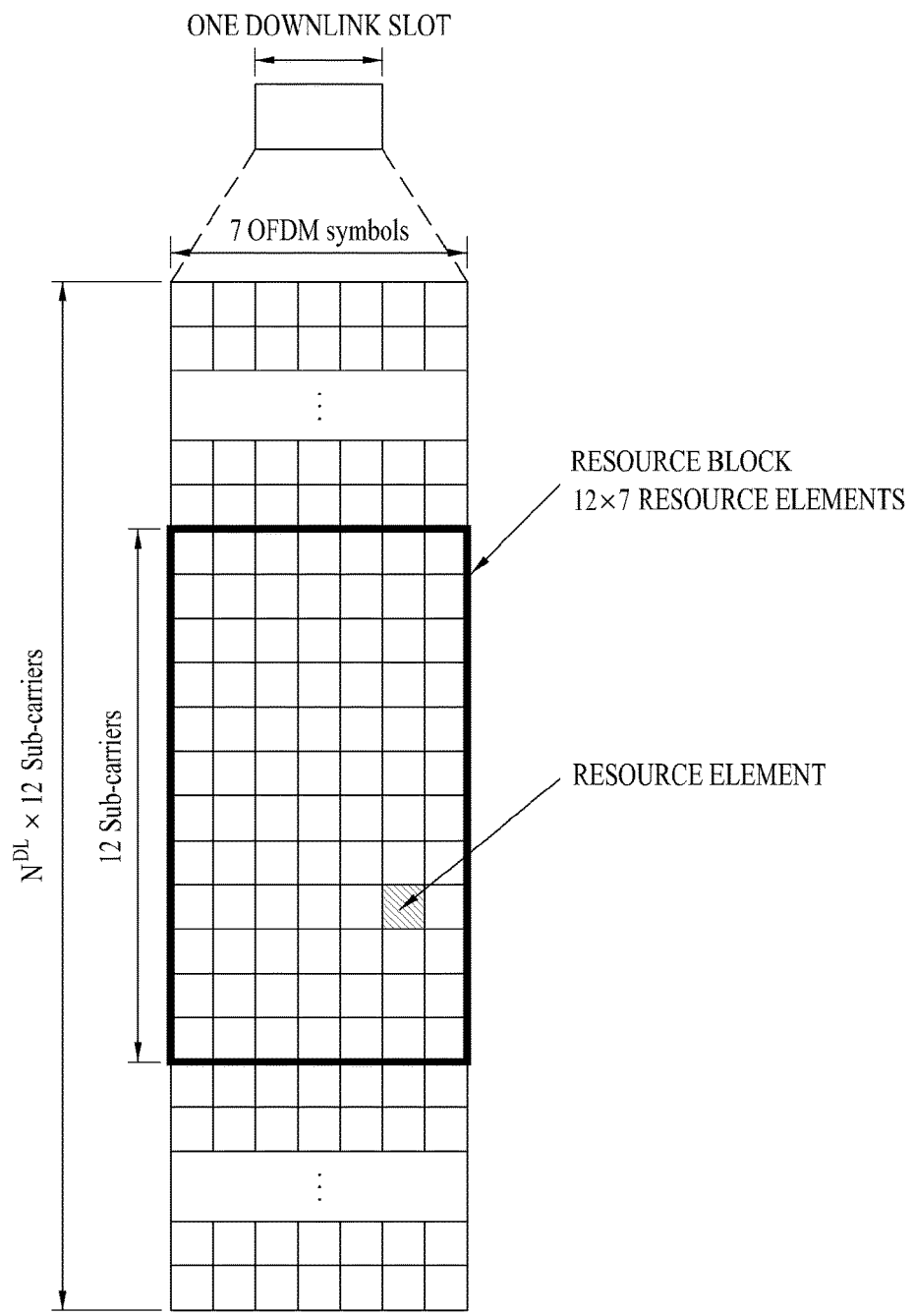
FIG. 2 is a diagram illustrating an example of a resource grid for the duration of one downlink slot.

FIG. 2 is a diagram illustrating an example of a resource grid in one downlink slot. OFDM symbols are configured by the normal CP. Referring to FIG. 2, the downlink slot includes a plurality of OFDM symbols in the time domain and includes a plurality of RBs in the frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, an RE a(k,l) is located at a kth subcarrier and an lth OFDM symbol. In case of a normal CP, one RB includes 12×7 REs (in case of an extended CP, one RB includes 12×6 REs). Since the spacing between subcarriers is 15 kHz, one RB is about 180 kHz in the frequency domain. NDL denotes the number of RBs included in the downlink slot. NDL is determined based on a downlink transmission bandwidth set through Node B scheduling.

Figure 3:
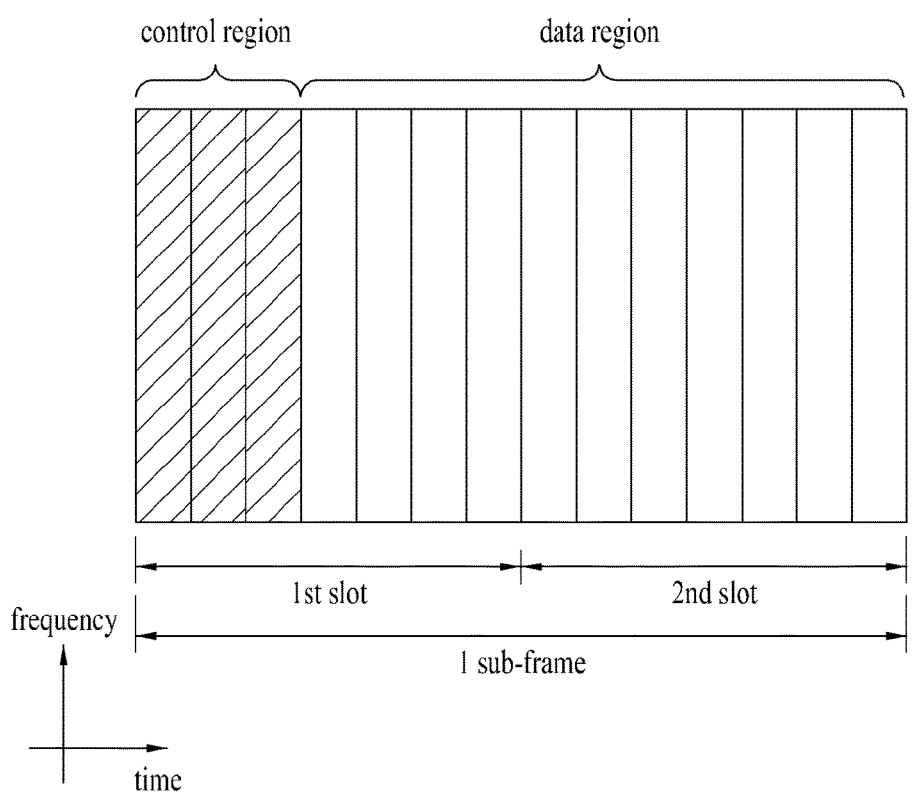
FIG. 3 is a diagram illustrating the structure of a downlink subframe.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
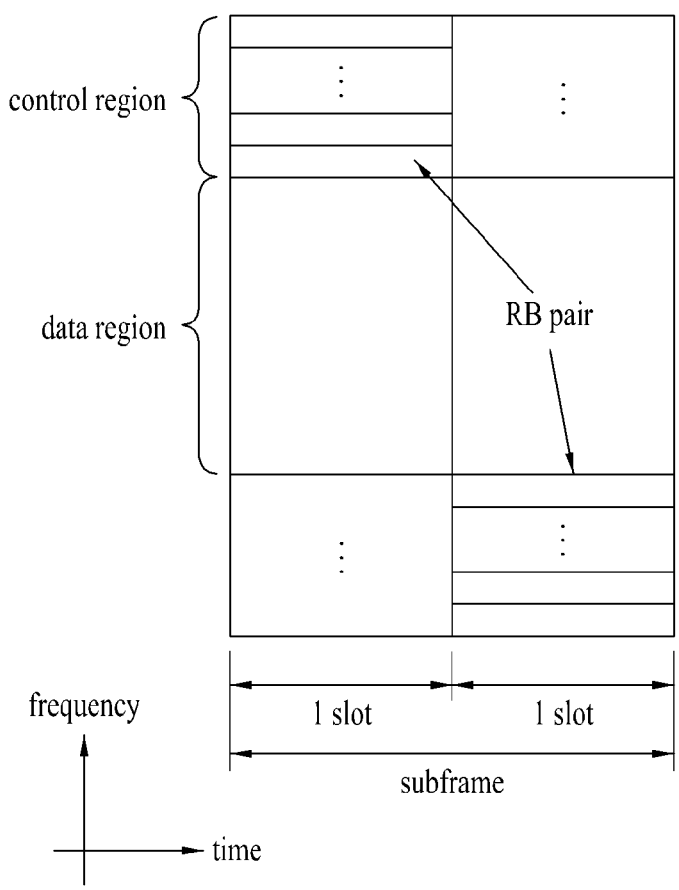
FIG. 4 is a diagram illustrating the structure of an uplink subframe.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

Figure 5:
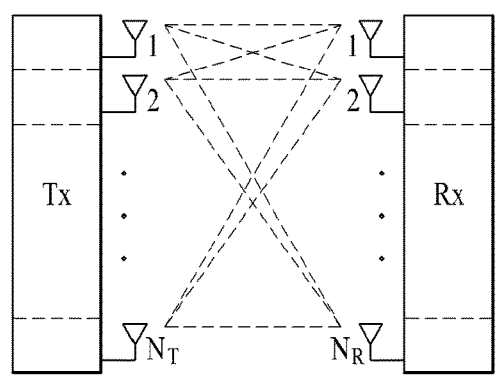
FIG. 5 is a diagram illustrating the configuration of a wireless communication system having multiple antennas.
Figure 5:
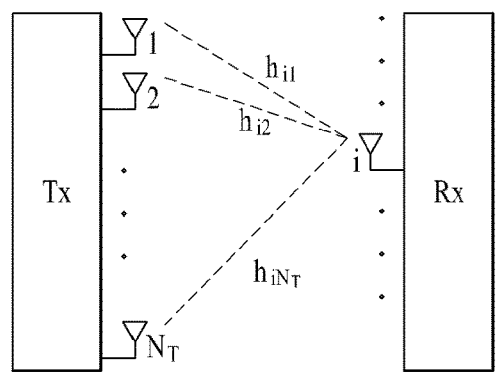

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\bar{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \qquad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as [Equation 7].

$$h_i^T = [h_{i1}, h_{i2}, \ldots, h_{iN_T}] \qquad \text{[Equation 7]}$$

Hence, all channels from the NT Tx antennas to the NR Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the NR Rx antennas is given as the following vector.

$$n = [n_1, n_2, \ldots, n_{N_R}]^T \qquad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \qquad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
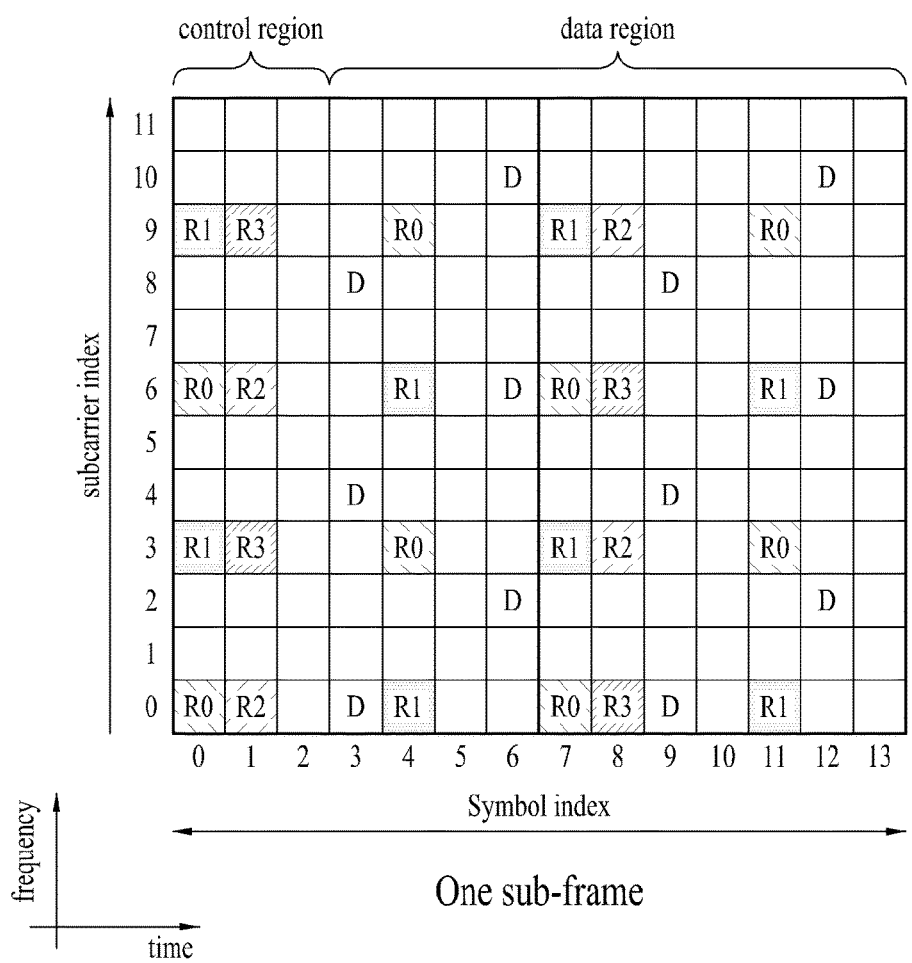
FIG. 6 illustrates a conventional Common Reference Signal (CRS) and Dedicated Reference Signal (DRS) pattern.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
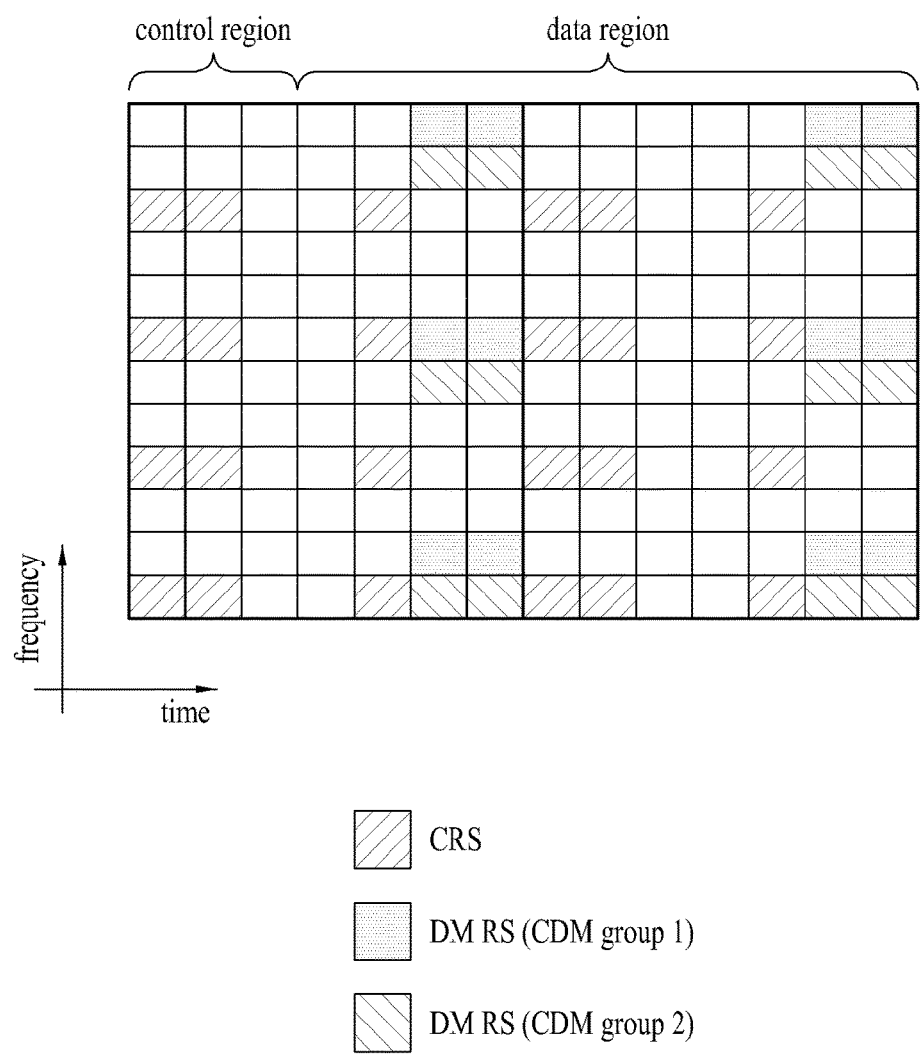
FIG. 7 illustrates an exemplary Demodulation Reference Signal (DM RS) pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
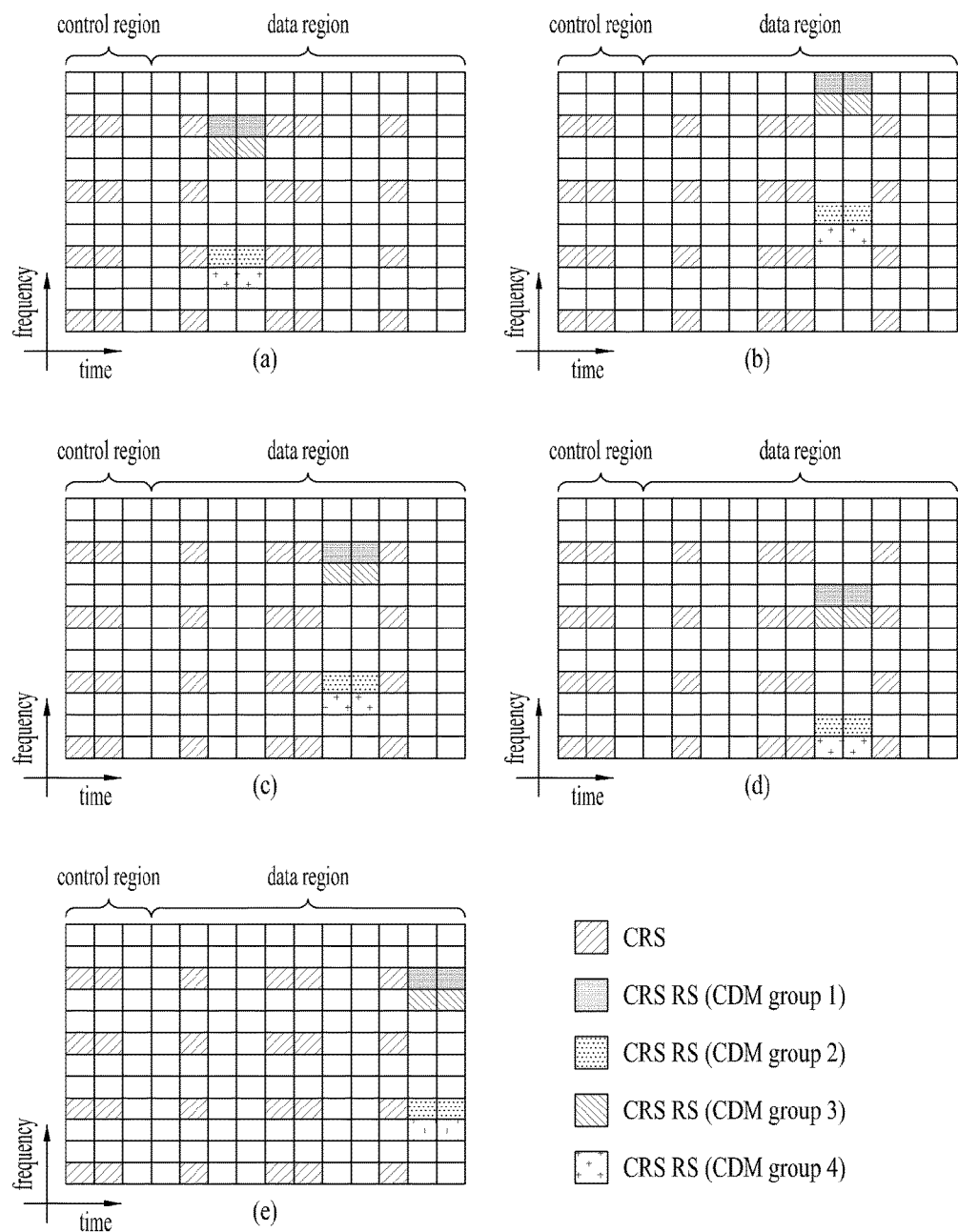
FIG. 8 illustrates exemplary Channel State Information-Reference Signal (CSI-RS) patterns.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

According to the JP scheme, each point (eNB) of a CoMP unit may use data. The CoMP unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP unit at one time. That is, one point of the CoMP unit transmits data to a single UE at a given time point, while the other points of the CoMP unit do not transmit data to the UE at the time point. A point to transmit data to a UE may be dynamically selected.

Meanwhile, in the CS/CB scheme, a CoMP unit may perform cooperative beamforming for data transmission to a single UE. While only a serving cell transmits data to the UE, user scheduling/beamforming may be determined through coordination among cells of the CoMP unit.

Uplink CoMP reception refers to uplink reception of a transmitted signal through coordination at a plurality of geographically separated points. Uplink CoMP schemes include Joint Reception (JR) and CS/CB.

In JR, a plurality of reception points receive a signal transmitted on a PUSCH. CS/CB is a technique in which while only one point receives a PUSCH, user scheduling/beamforming is determined through coordination among cells of a CoMP unit.

CSI-RS Configuration

In the LTE-A system supporting up to eight downlink Tx antennas, an eNB should transmit CSI-RSs for all the antenna ports, as described before. Because transmission of CSI-RSs for up to eight Tx antenna ports in every subframe leads to too much overhead, the CSI-RSs should be transmitted intermittently along the time axis to thereby reduce CSI-RS overhead. Therefore, the CSI-RSs may be transmitted periodically at every integer multiple of one subframe, or in a predetermined transmission pattern.

The CSI-RS transmission period or pattern of the CSI-RSs may be configured by the eNB. To measure the CSI-RSs, a UE should have knowledge of a CSI-RS configuration that has been set for CSI-RS antenna ports in its serving cell. The CSI-RS configuration may specify the index of a downlink subframe carrying CSI-RSs, the time-frequency positions of CSI-RS REs in the downlink subframe (e.g. a CSI-RS pattern as illustrated in FIGS. 8(a) to 8(e)), a CSI-RS sequence (a sequence used for CSI-RSs, generated pseudo-randomly based on a slot number, a cell ID, a CP length, etc. according to a predetermined rule), etc. That is, a given eNB may use a plurality of CSI-RS configurations and may indicate a CSI-RS configuration selected for use from among the plurality of CSI-RS configurations to a UE(UEs) in its cell.

To identify a CSI-RS for each antenna port, resources carrying the CSI-RS for the antenna port should be orthogonal to resources carrying CSI-RSs for other antenna ports. As described before with reference to FIG. 8, CSI-RSs for different antenna ports may be multiplexed in FDM using orthogonal frequency resources, in TDM using orthogonal time resources, and/or in CDM using orthogonal code resources.

When notifying UEs within the cell of CSI-RS information (i.e. a CSI-RS configuration), the eNB should first transmit to the UEs information about time-frequency resources (time information and frequency information) to which a CSI-RS for each antenna port is mapped. To be more specific, the time information may include the number of a subframe carrying CSI-RSs, a CSI-RS transmission period, a CSI-RS transmission subframe offset, and the number of an OFDM symbol carrying CSI-RS REs for an antenna. The frequency information may include a frequency spacing between CSI-RS REs for an antenna and a CSI-RS RE offset or shift value along the frequency axis.

Figure 9:
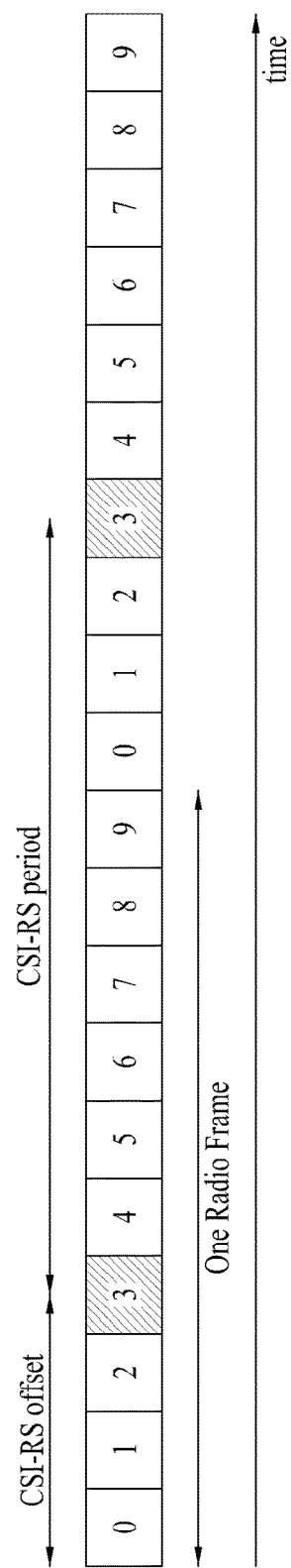
FIG. 9 is a diagram referred to for describing an exemplary periodic CSI-RS transmission.

FIG. 9 illustrates an exemplary periodic CSI-RS transmission. A CSI-RS may be transmitted periodically at every integer multiple of one subframe (e.g. in every 5, 10, 20, 40 or 80 subframes).

Referring to FIG. 9, one radio frame is divided into 10 subframes, subframe 0 to subframe 9. The eNB transmits a CSI-RS with a CSI-RS transmission period of 10 ms (i.e. in every 10 subframes) and a CSI-RS transmission offset of 3, by way of example. Different eNBs may have different CSI-RS transmission offsets so that CSI-RSs transmitted from a plurality of cells are uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which an eNB starts CSI-RS transmission in every predetermined period. When the eNB signals a CSI-RS transmission period and offset to a UE, the UE may receive a CSI-RS from the eNB in subframes determined by the CSI-RS transmission period and offset. The UE may measure a channel using the received CSI-RS and thus may report such information as a Channel Quality Indicator CQI), a PMI, and/or a Rank Indicator (RI) to the eNB. Unless a CQI, a PMI and an RI are separately described herein, they may be collectively referred to as a CQI (or CSI). The above information related to the CSI-RS is cell-specific information common to UEs within the cell. A CSI-RS transmission period and offset may be set separately for each individual CSI-RS configuration. For example, CSI-RS transmission periods and offsets may be separately set for a CSI-RS configuration for CSI-RSs transmitted with zero transmission power and a CSI-RS configuration for CSI-RSs transmitted with non-zero transmission power.

Figure 10:
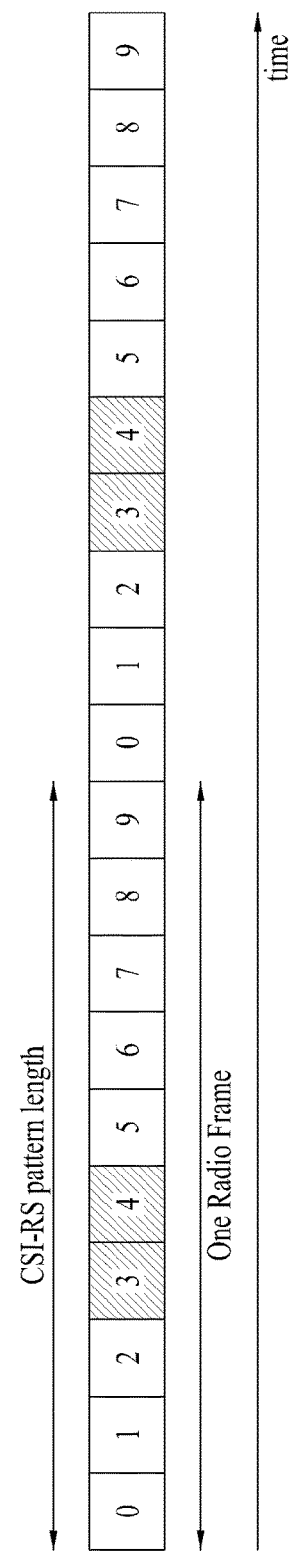
FIG. 10 is a diagram referred to for describing an exemplary aperiodic CSI-RS transmission.

FIG. 10 illustrates an exemplary aperiodic CSI-RS transmission. Referring to FIG. 10, one radio frame is divided into 10 subframes, subframe 0 to subframe 9. Subframes carrying CSI-RSs may be indicated in a predetermined pattern. For instance, a CSI-RS transmission pattern may be formed in units of 10 subframes and a 1-bit indicator may be set for each subframe to indicate whether the subframe carries a CSI-RS. In the illustrated case of FIG. 10, the CSI-RS pattern tells that subframe 3 and subframe 4 out of 10 subframes (i.e. subframe 0 to subframe 9) carry CSI-RSs. Such 1-bit indicators may be transmitted to a UE by higher-layer signaling.

Various CSI-RS configurations are available as described above. To enable a UE to receive CSI-RSs reliably for channel measurement, an eNB needs to signal a CSI-RS configuration to the UE. Now a description will be given below of embodiments of the present invention for signaling a CSI-RS configuration to a UE.

CSI-RS Configuration Signaling

The eNB may signal a CSI-RS configuration to the UE in two methods.

One of the methods is for the eNB to broadcast CSI-RS configuration information to UEs by Dynamic Broadcast CHannel (DBCH) signaling.

In the legacy LTE system, an eNB may transmit system information to UEs on a Broadcast CHannel (BCH). If the system information is too much to be transmitted on the BCH, the eNB may transmit the system information in the same manner as downlink data transmission. Notably, the eNB may mask the CRC of a PDCCH associated with the system information by an SI-RNTI, instead of a particular UE ID. Thus, the system information is transmitted on a PDSCH like unicast data. All UEs within the cell may decode the PDCCH using the SI-RNTI and thus acquire the system information by decoding the PDSCH indicated by the PDCCH. This broadcasting scheme may be referred to as DBCH signaling, distinguishably from general Physical BCH (PBCH) signaling.

Two types of system information are usually broadcast in the legacy LTE system. One type of system information is a Master Information Blok (MIB) transmitted on a PBCH and the other type of system information is a System Information Block (SIB) multiplexed with general unicast data in a PDSCH region. As the legacy LTE system defines SIB type 1 to SIB Type 8 (SIB1 to SIB8) for system information transmission, a new SIB type may be defined for CSI-RS configuration information which is new system information not defined as any conventional SIB type. For example, SIB9 or SIB10 may be defined and the eNB may transmit CSI-RS configuration information to UEs within its cell in SIB9 or SIB10 by DBCH signaling.

The other method for signaling CSI-RS configuration information is that the eNB transmits CSI-RS configuration information to each UE by Radio Resource Control (RRC) signaling. That is, the CSI-RS configuration information may be provided to each UE within the cell by dedicated RRC signaling. For example, while a UE is establishing a connection to the eNB during initial access or handover, the eNB may transmit the CSI-RS configuration information to the UE by RRC signaling. Alternatively or additionally, the eNB may signal the CSI-RS configuration information to the UE in an RRC signaling message requesting a channel state feedback based on CSI-RS measurement to the UE.

The foregoing two methods for signaling CSI-RS configurations and a CSI-RS configuration to be used for CSI feedback to a UE are applicable to the embodiments of the present invention.

CSI-RS Configuration Indication

The present invention provides a method for transmitting a CSI-RS in a predetermined subframe to a UE according to a CSI-RS configuration selected from among a plurality of available CSI-RS configurations by an eNB. According to the method, the eNB may signal the plurality of CSI-RS configurations to the UE and may also notify the UE of a CSI-RS configuration to be used for channel state measurement for CSI or CQI feedback from among the plurality of CSI-RS configurations.

A description will be given of indication of a selected CSI-RS configuration and CSI-RSs to be used for channel measurement to a UE by an eNB according to an embodiment of the present invention.

Figure 11:
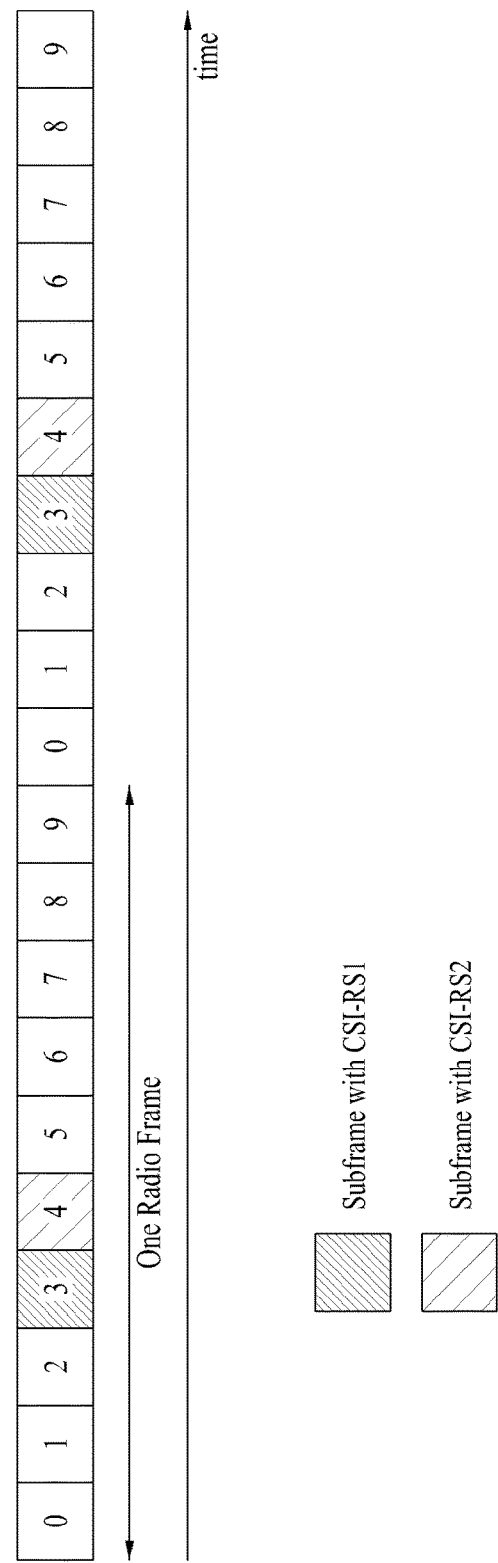
FIG. 11 is a diagram referred to for describing an example of using two CSI-RS configurations.

FIG. 11 illustrates an example of using two CSI-RS configurations. Referring to FIG. 11, one radio frame is divided into 10 subframes, subframe 0 to subframe 9. For a first CSI-RS configuration (CSI-RS1), a CSI-RS transmission period is 10 ms and a CSI-RS transmission offset is 3. For a second CSI-RS configuration (CSI-RS2), a CSI-RS transmission period is 10 ms and a CSI-RS transmission offset is 4. The eNB may signal the two CSI-RS configurations to the UE and notify the UE of a CSI-RS configuration to be used for CQI (or CSI) feedback.

Upon receipt of a CQI feedback request for a specific CSI-RS configuration from the eNB, the UE may measure a channel state using only CSI-RSs having the specific CSI-RS configuration. To be more specific, a channel state is a function of a CSI-RS reception quality, the amount of noise/interference, and a correlation coefficient between them. The CSI-RS reception quality may be measured using only the CSI-RSs having the specific CSI-RS configuration, and the amount of noise/interference and the correlation coefficient (e.g. an interference covariance matrix representing the direction of interference) may be measured in a subframe carrying the CSI-RSs or a predetermined subframe. For example, if the eNB requests a feedback for the first CSI-RS configuration to the UE, the UE may measure a reception quality using CSI-RSs received in a fourth subframe, subframe 3 in a radio frame. For the UE to calculate the amount of noise/interference and the correlation coefficient, the eNB may indicate an odd-numbered subframe to the UE. Alternatively or additionally, the eNB may confine the UE to a specific single subframe (e.g.

subframe 3), for measuring the CSI-RS reception quality and calculating the amount of noise/interference and the correlation coefficient.

For instance, the CSI-RS reception quality may be the Signal-to-Interference plus Noise Ratio (SINR) of the CSI-RSs, expressed as S/(I+N) (S is the strength of the received signal, I is the amount of interference, and N is the amount of noise). The strength of the received signal, S may be measured using CSI-RSs in a subframe carrying the CSI-RSs as well as a signal for the UE. Since I and N vary according to the amount of interference from adjacent cells and the directions of signals from the adjacent cells, they may be measured using CRSs transmitted in a subframe designated for measuring S, or in a separately defined subframe.

The amount of noise/interference and the correlation coefficient may be measured on REs carrying CRSs or CSI-RSs in a subframe or on null REs designated to facilitate noise/interference measurement. To measure noise/interference on CRS REs or CSI-RS REs, the UE may first recover CRSs or CSI-RSs, acquire a noise and interference signal by subtracting the recovered CRSs or CSI-RSs from a received signal, and thus calculate a statistical noise/interference value. A null RE is an empty RE with zero transmission power, carrying no signal. Null REs facilitate measurement of a signal transmitted from an eNB other than the eNB. While all of CRS REs, CSI-RS REs, and null REs may be used to calculate the amount of noise/interference and the correlation coefficient, the eNB may designate specific REs for noise/interference measurement for the UE, among the above REs. This is because appropriate REs need to be set for measurement at the UE depending on a neighbor cell transmits a data signal or a control signal on the REs. The neighbor cell may transmit a data signal or a control signal on the REs according to synchronization or non-synchronization between cells, a CRS configuration, and a CSI-RS configuration. Therefore, the eNB may determine the synchronization or non-synchronization between cells, the CRS configuration, and the CSI-RS configuration and designate REs for measurement for the UE according to the determination. That is, the eNB may indicate to the UE that the UE will measure noise/interference using all or part of the CRS REs, CSI-RS REs and null REs.

For example, a plurality of CSI-RS configurations are available to the eNB. The eNB may indicate one or more CSI-RS configurations, and may indicate to the UE a CSI-RS configuration selected for CQI feedback from among the CSI-RS configurations and the positions of null REs, for CSI feedback. The CSI-RS configuration selected for CQI feedback may be a CSI-RS configuration with non-zero transmission power, relative to null REs with zero transmission power. For example, the eNB may indicate one CSI-RS configuration for channel measurement to the UE and the UE may assume that CSI-RSs are transmitted with non-zero transmission power in the CSI-RS configuration. Additionally, the eNB may indicate a CSI-RS configuration with zero transmission power (i.e. the positions of null REs) to the UE and the UE may assume that the REs of the CSI-RS configuration have non-zero power. In other words, the eNB may notify the UE of a CSI-RS configuration with non-zero transmission power and, in the presence of a CSI-RS configuration with zero transmission power, the eNB may indicate the positions of null REs in the CSI-RS configuration with zero transmission power to the UE.

As a modification example to the above-described CSI-RS configuration indication method, the eNB may signal a plurality of CSI-RS configurations to the UE and may also signal all or part of the CSI-RS configurations, selected for CQI feedback to the UE. Upon receipt of a CQI feedback for a plurality of CSI-RS configurations, the UE may measure CQIs using CSI-RSs corresponding to the CSI-RS configurations and report the CQIs to the eNB.

To allow the UE to transmit the CQIs for the respective CSI-RS configurations, the eNB may predefine uplink resources for CQI transmission for each CSI-RS configuration and preliminarily provide information about the uplink resources to the UE by RRC signaling.

Additionally, the eNB may dynamically trigger CQI transmission for a CSI-RS configuration to the UE. The dynamic triggering of CQI transmission may be carried out through a PDCCH. The PDCCH may indicate a CSI-RS configuration for CQI measurement to the UE. Upon receipt of the PDCCH, the UE may feedback a CQI measurement result for the CSI-RS configuration indicated by the PDCCH to the eNB.

CSI-RSs may be set to be transmitted in different subframes or in the same subframe in a plurality of CSI-RS configurations. If CSI-RSs having different CSI-RS configurations are transmitted in the same subframe, it is necessary to distinguish them. To identify the CSI-RSs having different CSI-RS configurations in the same subframe, one or more of CSI-RS time resources, frequency resources, and code resources may be different for them. For example, the positions of REs carrying CSI-RSs may be different for different CSI-RS configurations in time or in frequency (for example, CSI-RSs with a CSI-RS configuration are transmitted on REs illustrated in FIG. 8(a) in a subframe and CSI-RSs with another CSI-RS configuration are transmitted on REs illustrated in FIG. 8(b) in the same subframe). If CSI-RSs with different CSI-RS configurations are transmitted on the same RE, different CSI-RS scrambling codes may be applied to the CSI-RSs.

Application Examples of CSI-RS Configuration

The technical feature of the present invention that a plurality of CSI-RS configurations are defined and a UE feeds back CQIs for the plurality of CSI-RS configurations can increase channel measurement performance, when it is applied to a heterogeneous-network wireless communication system, a Distributed Antenna System (DAS), a CoMP system, etc. However, the application examples of the present invention are not limited thereto and it is clearly understood that a plurality of CSI-RS configurations can be defined and used in various multiple-antenna systems according to the principle of the present invention.

First of all, an application example of the present invention to a heterogeneous-network wireless communication system will be described. A heterogeneous-network system may be a network where a macrocell and a microcell are co-existent. The term 'heterogeneous network' may refer to a network where a macrocell and a microcell are co-located in spite of the same Radio Access Technology (RAT). A macrocell is a generic BS having wide coverage and high transmission power in a wireless communication system, whereas a microcell is a small-sized version of the macrocell such as a femtocell or a home eNB, capable of performing most of the functions of the macrocell and independently operating. Within the heterogeneous network, a UE may be served directly from the macrocell (a macro UE) or directly from the microcell (a micro UE). The microcell may operate in a Closed Subscriber Group (CSG) manner or an Open Subscriber Group (OSG) manner. The microcell serves only authorized UEs in the former case and serves all UEs in the latter case. It may occur in the heterogeneous network that a downlink signal received from the macrocell at a UE near to the microcell, for example, at a UE near to the microcell but not served by the microcell is severely interfered from a downlink signal from the microcell. Therefore, Inter-Cell Interference Coordination (ICIC) is significant to the heterogeneous network.

For efficient ICIC between heterogeneous cells in the heterogeneous network environment, a plurality of CSI-RS configurations may be defined and channel quality may be measured according to the plurality of CSI-RS configurations. For example, if a limited time area is available to a microcell, for example, the microcell is limited to even-numbered subframes for signal transmission, and a macrocell uses different transmission power and beam directions in even-numbered and odd-numbered subframes to reduce interference with the microcell, a macro UE may experience different channel quality in the even-numbered subframe from in the odd-numbered subframe. Without taking into account the different channel environments of different subframes for the macro UE, a channel quality measured and reported by the macro UE may be different from the channel quality of a real channel environment, thereby degrading overall network performance. To avert this problem, different CSI-RS configurations may be applied to a plurality of different time areas under different channel environments and thus the UE may measure and report a CQI for each CSI-RS configuration using CSI-RSs received according to the plurality of CSI-RS configurations in accordance with the foregoing various embodiments of the present invention.

Regarding an application example of the present invention to a DAS, an eNB may have a plurality of antennas at different positions substantially spaced from one another in the DAS. For example, given eight antennas to an eNB, four antennas out of the eight antennas may be installed near to the eNB, two antennas out of the remaining four antennas are installed at a remote place from the eNB and connected to the eNB via an optical relay, and the other two antennas are installed at a remote place in the opposite direction from the eNB and connected to the eNB via another optical relay. The eight antennas may be grouped into three antenna groups having two, four and two antennas, respectively, according to their installation positions. In the DAS, different channel environments may be deployed according to the positions of physical antennas. If CQIs are measured in the same manner with no regard for different channel environments, the real channel environments may not be measured correctly. To solve this problem, an eNB may allocate different CSI-RS configurations to a plurality of antenna groups under different channel environments and may indicate one or more CSI-RS configurations, and the eNB may provide a CSI-RS configuration selected for UE's CQI feedback from among the one or more CSI-RS configurations and the positions of null REs to an individual UE by dedicated RRC signaling according to the various embodiments of the present invention. Or the eNB may indicate one or more CSI-RS configurations for UE's CQI feedback and the positions of null REs to an individual UE by dedicated RRC signaling. The UE may measure and report a CQI for the CSI-RS configuration set for CQI feedback using CSI-RSs received according to the CSI-RS configuration. In this manner, CQI measurement and reporting may be carried out on a CSI-RS configuration basis (i.e. on an antenna group basis). For this purpose, the number of antennas for each CSI-RS configuration may be set independently.

Now a description will be given of an application example of the present invention to a CoMP system. The CoMP system transmits a signal through cooperation of a plurality of cells to improve performance. CoMP transmission/reception refers to communication between a UE and an eNB (an AP or a cell) through cooperation between two or more eNBs (APs or cells). The term 'eNB' is interchangeably used with 'cell', 'AP' or 'point' in the CoMP system. CoMP schemes are largely classified into CoMP-JP and CoMP-CS/CB. In CoMP-JP, CoMP eNBs simultaneously transmit data to a UE at a given point of time and the UE combines the received signals, thereby increasing reception performance. On the other hand, in CoMP-CS/CB, one eNB transmits data to a UE at a given point of time, while UE scheduling or beamforming is performed to minimize interference from other eNBs.

For a reliable CoMP operation, the UE should measure CSI-RSs from neighbor cells included in a CoMP unit as well as CSI-RSs from a serving cell and feed back measured channel information to the eNB. Therefore, the eNB needs to notify the UE of the CSI-RS configurations of the serving cell and the neighbor cells. According to the afore-described embodiments of the present invention, the eNB may indicate to the UE a plurality of CSI-RS configurations as if these CSI-RS configurations were for the eNB, and may also indicate to the UE a CSI-RS configuration for channel information feedback selected from among the CSI-RS configurations.

On the assumption that a serving cell with A Tx antennas and a neighbor cell with B Tx antennas cooperate for communication, the following three CSI-RS configurations may be defined.

CSI-RS Configuration 1: the CSI-RS configuration of the serving cell (CSI-RSs for the A Tx antennas)

CSI-RS Configuration 2: the CSI-RS configuration of the neighbor cell (CSI-RSs for the B Tx antennas)

CSI-RS Configuration 3: the CSI-RS configuration of a virtual single cell (CSI-RSs for the A+B Tx antennas)

The UE may feed back channel information as illustrated in Table 1 according to the CSI-RS configurations indicated by the eNB.

TABLE 1

| | Configuration 1 | Configuration 2 | Configuration 3 | CSI feedback contents |
| --- | --- | --- | --- | --- |
| Case 1 | On | Off | Off | CSI feedback for Serving cell |
| Case 2 | Off | On | Off | CSI feedback for neighbor cell |
| Case 3 | On | On | Off | Joint or separate CSI feedbacks for serving cell and neighbor cell |
| Case 4 | Off | Off | On | CSI feedback for virtual single cell |
| Case 5 | On | Off | On | CSI feedback for serving cell and CSI feedback for virtual single cell |

When the above plurality of CSI-RS configurations are defined, the UE does not need to identify a cell that transmits CSI-RSs according to each CSI-RS configuration. The UE has only to measure CSI-RSs received according to a CSI-RS configuration indicated by the eNB and feed back measured CSI to the eNB. Accordingly, an eNB may define a plurality of CSI-RS configurations and indicate a CSI-RS configuration for CSI feedback to a UE, and then the UE may measure and report channel information using CSI-RSs received according to the indicated CSI-RS configuration in the application example to the CoMP system according to the present invention.

In the case where the plurality of CSI-RS configurations illustrated in Table 1 are defined, a serving eNB basically operates in Case 1. When CoMP information is needed, the serving eNB may acquire CSI required for a CoMP operation by configuring Case 2, Case 3 or Case 4 for a CoMP candidate UE. The CSI required for CoMP may include channel information between a neighbor cell and the CoMP candidate UE, channel information between a serving cell and the CoMP candidate UE, and CoMP CSI for an assumed CoMP operation, and CSI for a virtual single cell with A+B antennas. In each case, the UE operates in the following manner.

In Case 1, the UE may measure CSI-RSs received from the serving cell according to CSI-RS Configuration 1 and feed back CSI for the serving cell to the eNB. The CSI is same as CSI that the eNB receives from the UE in a non-CoMP environment.

In Case 2, the UE may measure CSI-RSs received from the neighbor cell according to CSI-RS Configuration 2 and feed back CSI for the neighbor cell to the eNB. The UE regards the measured channel as one from the serving cell without any need to identify a cell that transmits the channel. From the perspective of the UE, although only channels to be measured are different in Case 1 and Case 2, CSI may be generated in the same manner in both cases.

In Case 3, the UE may measure CSI-RSs received from the serving cell according to CSI-RS Configuration 1 and CSI-RSs received from the neighbor cell according to CSI-RS Configuration 2 and generate CSI separately for the serving cell and the neighbor cell. For the CSI generation, the UE may measure channels, regarding them as received from the serving cell without any need to identify actual cells that transmit the channels. The UE may transmit the CSI generated according to CSI-RS Configurations 1 and 2, together or separately on the downlink to the eNB.

Alternatively or additionally, the UE may generate CoMP CSI, assuming a specific CoMP operation in Case 3. For example, on the assumption of CoMP-JP, the UE may calculate a rank and a CQI that may be achieved from joint transmission, select a PMI from a joint-transmission codebook, and feed back an RI, the PMI, and the CQI to the eNB.

In Case 4, the UE may measure CSI-RSs for a virtual single cell with A+B antennas according to CSI-RS Configuration 3. To be more specific, the UE receives part of the CSI-RSs from the serving cell and the remaining CSI-RSs from the neighbor cell. For successful implementation of Case 4, each of the eNBs of the serving cell and the neighbor cell should transmit CSI-RSs at the positions of CSI-RS REs of the virtual single cell with the A+B antennas. For example, if the CSI-RSs of the single cell with the A+B antennas are allocated to RE1 to RE(A+B), the serving cell should transmit CSI-RSs on RE1 to REA and the neighbor cell should transmit CSI-RSs on RE(A+1) to RE(A+B). If the REs carrying the CSI-RSs from the serving cell and the neighbor cell satisfy the above condition, the operation is successful. Otherwise, an additional CSI-RS transmission may be needed.

Figure 12:
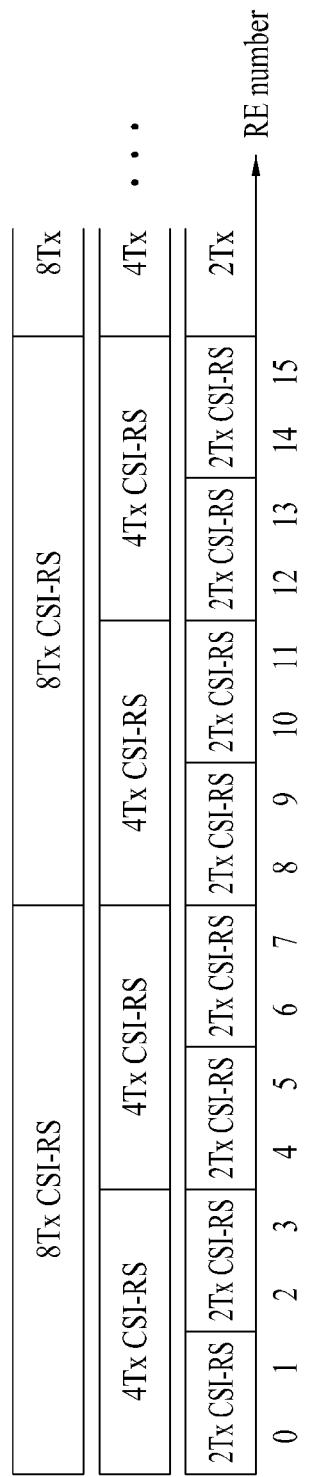
FIG. 12 is a diagram referred to for describing mapping between CSI-RSs and Resource Elements (REs) according to the number of antennas.

In general, CSI-RSs are mapped to REs according to the number of antennas in a tree structure as illustrated in FIG. 12. Referring to FIG. 12, 8Tx CSI-RS represents a group of REs to which CSI-RSs for eight Tx antennas are mapped. 4Tx CSI-RS represents a group of REs to which CSI-RSs for four Tx antennas are mapped. 2Tx CSI-RS represents a group of REs to which CSI-RSs for two Tx antennas are mapped. As illustrated in FIG. 12, one 8 Tx CSI-RS RE group is the sum of two 4 Tx CSI-RS RE groups and one 4 Tx CSI-RS RE group is the sum of two 2 Tx CSI-RS RE groups. However, a 4 Tx CSI-RS RE group with RE #4 to RE #7 and another 4 Tx CSI-RS RE group with RE #8 to RE #11 do not form an 8 Tx CSI-RS RE group because of group misalignment in the tree structure. For example, if a serving cell with four Tx antennas uses RE #4 to #7 for CSI-RS transmission and a neighbor cell with four Tx antennas uses RE #8 to #11 for CSI-RS transmission, the serving cell, the neighbor cell, or both should be able to map additional CSI-RSs so as to form one 8 Tx CSI-RS RE group for a CoMP candidate UE. That is, the serving cell may transmit new 4Tx CSI-RSs on RE #12 to RE #15, the neighbor cell may transmit new 4Tx CSI-RSs on RE #0 to RE #3, or each of the two cells may transmit new 4Tx CSI-RSs, for example, the serving cell may transmit additional new 4Tx CSI-RSs on RE #16 to RE #19 and the neighbor cell may transmit additional new 4Tx CSI-RSs on RE #20 to RE #23. Therefore, the UE may perceive the received CSI-RSs as 8Tx CSI-RSs.

Despite increased control signal overhead, transmission of additional CSI-RSs to the CoMP candidate UE according to the characteristics of the CoMP candidate UE may increase network performance. In other words, although conventional CSI-RSs are designed to be universal so that all UEs within a cell can receive the CSI-RSs, the additional CSI-RSs for a CoMP operation are used only for the CoMP candidate UE in the above example. Hence, CSI-RS design and transmission can be optimized for the purpose. For example, the additional CSI-RSs may be precoded, taking into account of a CoMP UE at a cell edge, so that they are steered toward the cell edge by beamforming. Or the additional CSI-RSs may be precoded such that the spatial characteristics of channels measured using CSI-RSs received from the serving cell and the neighbor cell by the UE are similar to the spatial characteristics of a virtual single cell PMI codebook for the A+B Tx antennas. If precoding is applied to CSI-RSs, the eNB should additionally apply a precoder used for CSI-RSs as well as a precoder calculated based on CSI to actual data for the CoMP UE. That is, let transmission data, a precoding matrix acquired using CSI reported by the UE, and a precoding matrix used for CSI-RS transmission be denoted by x, W and W0, respectively. Then a signal transmitted from the eNB is W0×W×x and the UE receives a signal Y=H×W0×W×x+N from the eNB where N denotes noise.

In Case 4, the UE may generate and feed back CSI by measuring channels, on the assumption that the channels are from a serving cell with A+B Tx antennas. For example, if A=B=4, the UE may generate an RI, a PMI and a CQI defined in an 8Tx single cell environment and feed back these values to the serving eNB.

In Case 5, the UE may measure CSI-RSs received from the serving cell with A Tx antennas according to CSI-RS Configuration 1 and may simultaneously measure CSI-RSs transmitted from the serving cell and the neighbor cell through with eight Tx antennas according to CSI-RS Configuration 3. Therefore, the UE may generate non-CoMP CSI based on the channel measurement using the CSI-RSs received according to CSI-RS Configuration 1 and feedback the non-CoMP CSI to the eNB. In addition, the UE may generate CSI based on the channel measurement using the CSI-RSs received according to CSI-RS Configuration 3, considering the measured channels to be channels from the serving cell with the A+B Tx antennas and feedback the CSI to the eNB.

The above-described application examples of the present invention are pure exemplary, which should not be construed as limiting the present invention. That is, an eNB may set two or more CSI-RS configurations and notify a UE of the CSI-RS configurations. The eNB may then command the UE to feed back CSI for all or part of the CSI-RS configurations. Hence, the UE may report the measurements of channel states for the CSI-RS configurations, together or separately on the uplink to the eNB. This principle of the present invention is applicable to various systems supporting transmission through multiple antennas. CSI-RSs with different CSI-RS configurations may be transmitted through the same antenna group within the same cell by radiating antenna beams in different directions, through different antenna groups geographically apart from one another within the same cell, or through antennas of different cells.

Figure 13:
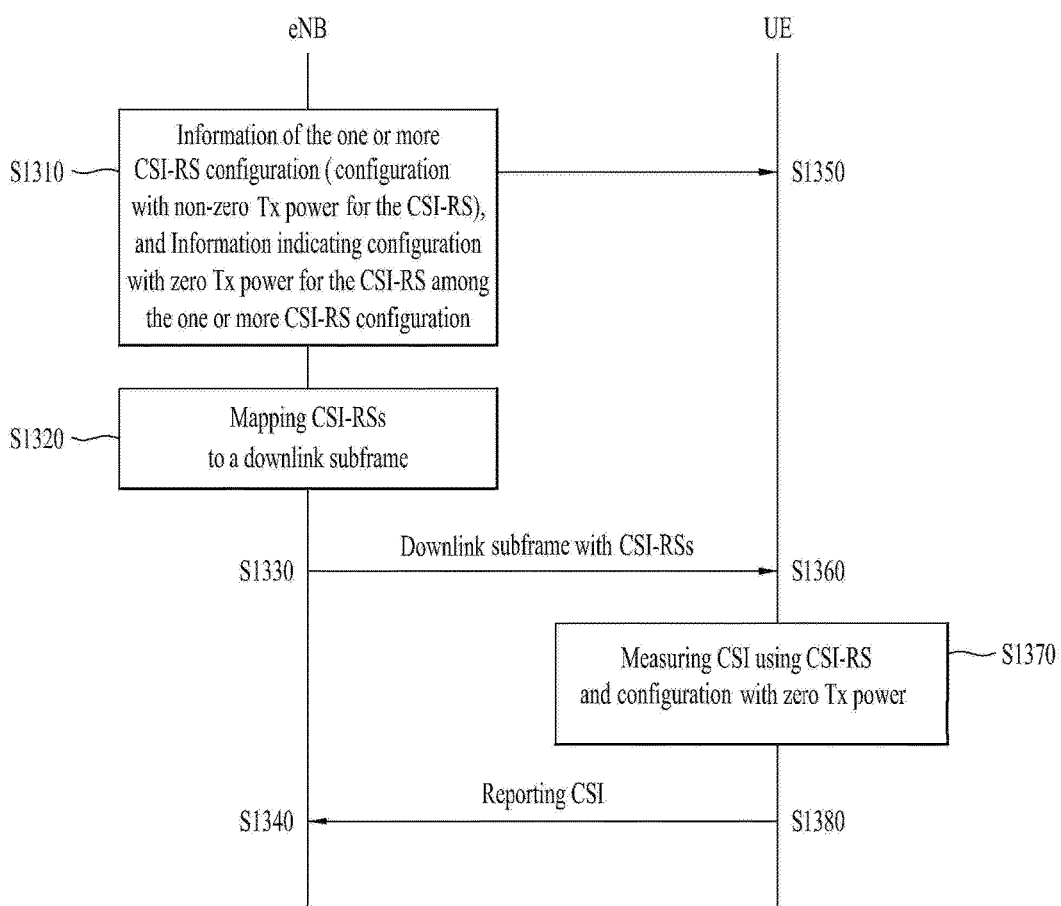
FIG. 13 is a diagram illustrating a signal flow for a method for transmitting CSI-RS configuration information according to an embodiment of the present invention.

FIG. 13 is a diagram illustrating a signal flow for a method for transmitting CSI-RS configuration information according to an embodiment of the present invention. While an eNB and a UE are described in FIG. 13 for illustrative purposes, the operation may take place between an eNB and a relay or between a relay and a UE in the same manner.

On or more CSI-RS configurations are available to an eNB. A CSI-RS configuration may include a configuration for time, frequency and/or code resources allocated for transmission of CSI-RSs. For instance, CSI-RSs may be transmitted in one of the patterns (i.e. time-frequency positions) illustrated in FIGS. 8(a) to 8(e) according to the CSI-RS configuration. The CSI-RS configuration may specify the positions of REs to which the CSI-RSs are mapped according to the number of antenna ports (e.g. 1, 2, 4 or 8) through which the CSI-RSs are transmitted.

One of the one or more CSI-RS configurations available to the eNB may indicate the positions of REs carrying CSI-RSs for channel measurement at a UE, that is, the positions of REs carrying CSI-RSs with non-zero transmission power. If there are CSI-RSs transmitted with zero transmission power, for example, if a neighbor eNB transmits CSI-RSs, the one or more CSI-RS configurations available to the eNB may include a CSI-RS configuration indicating the positions of REs carrying CSI-RSs with zero transmission power. An operation of the eNB will first be described below.

Referring to FIG. 13, the eNB may transmit information about one or more CSI-RS configurations to the UE (S1310). The one or more CSI-RS configurations may include a CSI-RS configuration in which the UE assumes non-zero transmission power for CSI-RSs, that is, a CSI-RS configuration for CSI-RSs for use in channel measurement at the UE. In addition, the eNB may transmit to the UE information indicating a CSI-RS configuration in which the UE assumes zero transmission power for CSI-RSs, that is, a CSI-RS configuration indicating null REs as CSI-RS REs in step S1310.

The eNB may map CSI-RSs to REs in a downlink subframe according to the one or more CSI-RS configurations (S1320). The downlink subframe to which the CSI-RSs are mapped may be configured according to a cell-specific CSI-RS transmission period and a CSI-RS transmission offset. The CSI-RS transmission period and the CSI-RS transmission offset may be set separately for each CSI-RS configuration. For example, CSI-RS transmission periods and CSI-RS transmission offsets may be set differently for CSI-RSs for which the UE assumes non-zero transmission power and CSI-RSs for which the UE assumes zero transmission power.

The eNB may transmit the downlink subframe to the UE (S1330) and receive CSI that is measured using the CSI-RSs from the UE (S1340).

Now a description will be given of an operation of the UE.

The UE may receive the information about the one or more CSI-RS configurations from the eNB (S1350). The one or more CSI-RS configurations may include a CSI-RS configuration in which the UE assumes non-zero transmission power for CSI-RSs, that is, a CSI-RS configuration for CSI-RSs for use in channel measurement at the UE. In addition, the eNB may transmit to the UE information indicating a CSI-RS configuration in which the UE assumes zero transmission power for CSI-RSs, that is, a CSI-RS configuration indicating null REs as CSI-RS REs in step S1350.

The UE may receive the downlink subframe to which CSI-RSs are mapped (S1360). A cell-specific CSI-RS transmission period and a CSI-RS transmission offset may be set cell-specifically or separately for each CSI-RS configuration.

The UE measures a downlink channel using the received CSI-RSs and generates CSI (an RI a PMI, a CQI, etc.) based on the downlink channel measurement and the CSI-RS configuration indicating null REs (S1370). The UE may report the CSI to the eNB (S1380).

The afore-described embodiments of the present invention may be implemented individually or two or more embodiments of the present invention may be implemented simultaneously in the method for providing CSI-RS configuration information described above with reference to FIG. 13. Redundant descriptions are omitted for clarity.

Figure 14:
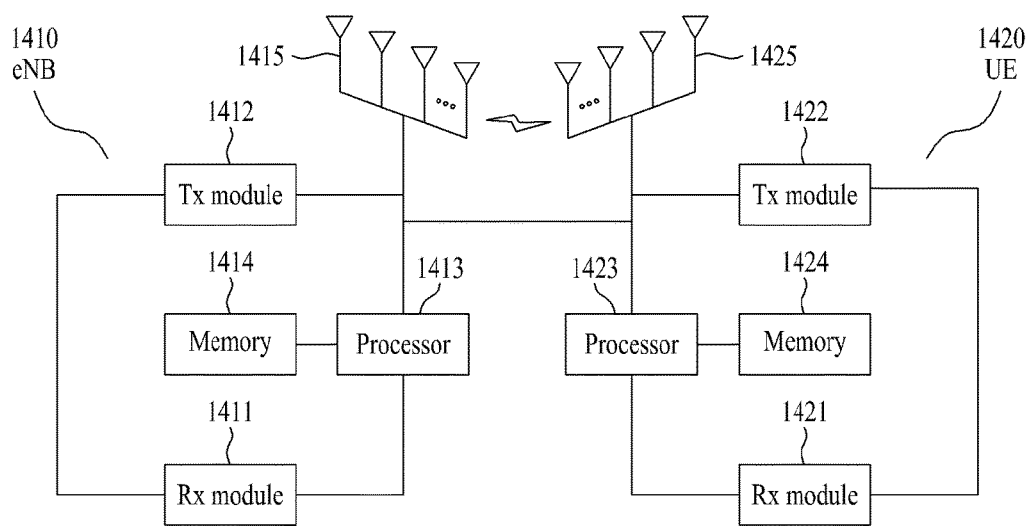
FIG. 14 is a block diagram of an evolved Node B (eNB) apparatus and a User Equipment (UE) apparatus according to an embodiment of the present invention.

FIG. 14 is a block diagram of an eNB apparatus and a UE apparatus according to an embodiment of the present invention.

Referring to FIG. 14, an eNB apparatus 1410 may include an Rx module 1411, a Tx module 1412, a processor 1413, a memory 1414, and a plurality of antennas 1415. The plurality of antennas 1415 support MIMO transmission and reception. The Rx module 1411 may receive uplink signals, data and information from UEs. The Tx module 1412 may transmit downlink signals, data and information to UEs. The processor 1413 may provide overall control to the eNB apparatus 1410.

In accordance with an embodiment of the present invention, the eNB apparatus 1410 may be adapted to transmit CSI-RSs for transmission through multiple antennas. The processor 1413 may transmit information about one or more CSI-RS configurations to a UE apparatus 1420 through the Tx module 1412. The one or more CSI-RS configurations may include a CSI-RS configuration indicating transmission of CSI-RSs with non-zero transmission power. In addition, the processor 1413 may transmit information indicating a CSI-RS configuration indicating transmission CSI-RSs with zero transmission power among the one or more CSI-RS configurations to the UE apparatus 1420 through the Tx module 1412. The processor 1413 may map CSI-RSs to REs in a downlink subframe according to the one or more CSI-RS configurations. The processor 1413 may transmit the downlink subframe to the UE apparatus 1420 through the Tx module 1412.

Besides, the processor 1413 processes information received at the eNB apparatus 1410 and transmission information. The memory 1414 may store the processes information for a predetermined time. The memory 1414 may be replaced with a component such as a buffer (not shown).

The UE apparatus 1420 may include an Rx module 1421, a Tx module 1422, a processor 1423, a memory 1424, and a plurality of antennas 1425. The plurality of antennas 1425 support MIMO transmission and reception. The Rx module 1421 may receive downlink signals, data and information from an eNB. The Tx module 1422 may transmit uplink signals, data and information to an eNB. The processor 1423 may provide overall control to the UE apparatus 1420.

In accordance with an embodiment of the present invention, the UE apparatus 1420 may be adapted to transmit CSI using CSI-RSs received from an eNB supporting transmission through multiple antennas. The processor 1423 may receive information about one or more CSI-RS configurations from the eNB apparatus 1410 through the Rx module 1421. The one or more CSI-RS configurations may include a CSI-RS configuration indicating transmission of CSI-RSs with non-zero transmission power. In addition, the processor 1423 may receive information indicating a CSI-RS configuration indicating transmission CSI-RSs with zero transmission power among the one or more CSI-RS configurations to the eNB apparatus 1120 through the Rx module 1421. The processor 1423 may receive a downlink subframe in which CSI-RSs are mapped to REs according to the one or more CSI-RS configurations from the eNB apparatus 1420 through the Rx module 1421. The processor 1423 may measure CSI using the CSI-RSs and transmit the CSI measurement result to the eNB apparatus 1410 through the Tx module 1422.

Besides, the processor 1423 processes information received at the UE apparatus 1420 and transmission information. The memory 1424 may store the processes information for a predetermined time. The memory 1424 may be replaced with a component such as a buffer (not shown).

The specific configurations of the above eNB and UE apparatuses may be implemented such that the various embodiments of the present invention are performed independently or two or more embodiments of the present invention are performed simultaneously. Redundant matters will not be described herein for clarity.

The same description of the eNB apparatus 1410 is applicable to a relay as a downlink transmitter or an uplink receiver, and the same description of the UE apparatus 1420 is applicable to the relay as a downlink receiver or an uplink transmitter.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Various embodiments have been described in the best mode for carrying out the invention. The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Although the description of the above-described embodiments of the present invention is focused mainly on a 3GPP LTE group system, the present invention will not be limited only to the exemplary assumption made in the description of the present invention. Herein, the embodiments of the present invention may be used and applied in various types of mobile communication systems having the MIMO technique applied thereto, by using the same principle.

What is claimed is:

1. A method for transmitting channel state information (CSI) to a base station by a mobile station in a wireless communication system, the method comprising:
   receiving, by the mobile station, first information about one or more channel quality measurement resources and second information about one or more interference measurement resources from a base station;
   receiving, by the mobile station, reference signals based on the first information from the base station;
   performing, by the mobile station, channel quality measurement based on the reference signals;
   performing, by the mobile station, interference measurement based on the second information;
   generating, by the mobile station, the CSI based on results of the channel quality measurement and the interference measurement; and
   transmitting, by the mobile station, the CSI to the base station,
   wherein the second information about one or more interference measurement resources indicates positions of resource elements (REs) muted by the base station.

2. The method according to claim 1, wherein the first information about one or more channel quality measurement resources indicates positions of REs for the reference signals.

3. The method according to claim 1, wherein the second information about one or more interference measurement resources indicates positions of REs where reference signals of a neighbor base station are transmitted.

4. The method according to claim 1, wherein the reference signals are channel state information—reference signals (CSI-RSs).

5. A method for receiving channel state information (CSI) from a mobile station by a base station in a wireless communication system, the method comprising:
   transmitting, by the base station to the mobile station, first information about one or more channel quality measurement resources and second information about one or more interference measurement resources;
   transmitting, by the base station to the mobile station, reference signals based on the first information; and
   receiving, by the base station from the mobile station, the CSI generated based on results of channel quality measurement and interference measurement, wherein the channel quality measurement is performed based on the reference signals by the mobile station, wherein the interference measurement is performed based on the second information by the mobile station, and wherein the second information about one or more interference measurement resources indicate positions of resource elements (REs) muted by the base station.

6. The method according to claim 5, wherein the first information about one or more channel quality measurement resources indicates positions of REs for the reference signals.

7. The method according to claim 5, wherein the second information about one or more interference measurement resources indicates positions of REs where reference signals of a neighbor base station are transmitted.

8. The method according to claim 5, wherein the reference signals are channel state information—reference signals (CSI-RSs).

9. A mobile station in a wireless communication system, the mobile station comprising:

a receiver;

a transmitter; and a processor configured to:

control the receiver to receive first information about one or more channel quality measurement resources and second information about one or more interference measurement resources from a base station, control the receiver to receive reference signals based on the first information from the base station, perform channel quality measurement based on the reference signals, perform interference measurement based on the second information, generate channel state information (CSI) based on results of the channel quality measurement and the interference measurement, and control the transmitter to transmit the CSI to the base station, wherein the second information about one or more interference measurement resources indicates positions of resource elements (REs) muted bathe base station.

10. The mobile station according to claim 9, wherein the first information about one or more channel quality measurement resources indicates positions of REs for the reference signals.

11. The mobile station according to claim 9, wherein the second information about one or more interference measurement resources indicates positions of REs where reference signals of a neighbor base station are transmitted.

12. The mobile station according to claim 9, wherein the reference signals are channel state information—reference signals (CSI-RSs).

13. A base station in a wireless communication system, the base station comprising:

a receiver;

a transmitter; and a processor configured to:

control the transmitter to transmit, to a mobile station, first information about one or more channel quality measurement resources and second information about one or more interference measurement resources, control the transmitter to transmit, to the mobile station, reference signals based on the first information, and control the receiver to receive, from the mobile station, channel state information (CSI) generated based on results of channel quality measurement and interference measurement, wherein the channel quality measurement is performed based on the reference signals by the mobile station, wherein the interference measurement is performed based on the second information by the mobile station, and wherein the second information about one or more interference measurement resources indicates positions of muted by the base station.

14. The base station according to claim 13, wherein the first information about one or more channel quality measurement resources indicates positions of REs for the reference signals.

15. The base station according to claim 13, wherein the second information about one or more interference measurement resources indicates positions of REs where reference signals of a neighbor base station are transmitted.

16. The base station according to claim 13, wherein the reference signals are channel state information—reference signals (CSI-RSs).

* * * * *